US009814926B1

(12) United States Patent
Izzolo, Jr.

(10) Patent No.: US 9,814,926 B1
(45) Date of Patent: *Nov. 14, 2017

(54) RESILIENT HAND PAD AND BLOCK SYSTEM FOR RELIEVING HAND AND WRIST STRESS, AND RELATED PAIN, DURING YOGA AND RELATED FLOOR-BASED POSES AND EXERCISES

(71) Applicant: Michael Leonard Izzolo, Jr., Palm City, FL (US)

(72) Inventor: Michael Leonard Izzolo, Jr., Palm City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,622

(22) Filed: Jan. 27, 2017

Related U.S. Application Data

(63) Continuation of application No. 14/685,305, filed on Apr. 13, 2015, now Pat. No. 9,555,275.

(51) Int. Cl.
*A63B 21/00* (2006.01)
*A63B 23/00* (2006.01)

(52) U.S. Cl.
CPC .......... *A63B 21/4039* (2015.10); *A63B 23/00* (2013.01); *A63B 2023/006* (2013.01); *A63B 2209/14* (2013.01)

(58) Field of Classification Search
CPC .............. A63B 21/4035; A63B 26/003; A63B 21/00047; A63B 2210/50; A63B 21/068; A63B 2208/0219; A63B 2208/0214; A63B 2208/0295; A63B 23/16; A63B 21/4025; A63B 23/14; A63B 21/4019; A63B 21/028; A63B 26/00; A47L 13/18; A47L 13/19; A47L 13/16; A47L 23/10; A47L 25/08; A47L 13/17; A47L 1/15; A47L 21/04; A47L 23/04
USPC .................. 482/4–49, 131–139, 142; 15/227
See application file for complete search history.

(56) References Cited

U.S. PATENT DOCUMENTS

| | | | | | |
|---|---|---|---|---|---|
| 1,477,460 | A | * | 12/1923 | Smith | A63B 60/40 473/518 |
| 1,994,425 | A | * | 3/1935 | Weller | A47L 13/19 15/104.94 |
| 2,071,365 | A | * | 2/1937 | Stroop | A47L 13/19 15/104.94 |
| 2,159,972 | A | * | 5/1939 | Larson | A63B 31/08 441/58 |
| 2,994,530 | A | * | 8/1961 | Cohan | A63D 5/00 473/55 |
| 3,295,518 | A | * | 1/1967 | Hazlewood | A61M 5/52 128/877 |
| 4,441,487 | A | * | 4/1984 | Daugherty | A61H 23/0218 132/73 |
| 4,977,621 | A | * | 12/1990 | Richard | A41D 13/082 2/161.1 |
| 5,127,127 | A | * | 7/1992 | Jarosinski | A47L 13/18 15/104.94 |

(Continued)

*Primary Examiner* — Andrew S Lo
(74) *Attorney, Agent, or Firm* — McHale & Slavin, P.A.

(57) ABSTRACT

A hand pad for stabilizing and supporting on a floor or other surface the hand of a user during either stationary/static or dynamic exercises includes a hand pad body having a top surface defining a debossed profile of a human hand, or human hand-shaped cavity, for receiving therein a hand of a user. An optional complementary block may be provided having a top side constructed for releasable engagement with the hand pad body.

18 Claims, 8 Drawing Sheets

(56) References Cited

U.S. PATENT DOCUMENTS

| | | | | |
|---|---|---|---|---|
| 5,209,490 A * | 5/1993 | Dallavecchia | A63B 59/20 | 273/348.4 |
| 5,256,136 A * | 10/1993 | Sucher | A61F 13/104 | 128/879 |
| 5,562,270 A * | 10/1996 | Montague | A47B 21/0371 | 248/118.1 |
| 5,956,770 A * | 9/1999 | Dennis | A47L 13/18 | 15/227 |
| 6,093,159 A * | 7/2000 | Racoosin | A61H 15/0092 | 601/118 |
| 6,315,696 B1 * | 11/2001 | Garrioch | A61H 23/04 | 482/44 |
| 6,487,726 B1 * | 12/2002 | Sitiku | A46B 5/04 | 2/158 |
| 7,494,395 B2 * | 2/2009 | Krikliwy | A63B 31/10 | 441/56 |
| 7,717,483 B1 * | 5/2010 | Bombara | A47G 23/0625 | 206/557 |
| 9,101,801 B2 * | 8/2015 | Cohen | A63B 60/08 | |
| 9,131,821 B2 * | 9/2015 | Powell | A47L 13/16 | |
| 2006/0032780 A1 * | 2/2006 | Heyn | A47G 23/0625 | 206/557 |
| 2006/0053575 A1 * | 3/2006 | Ragland | A47L 13/18 | 15/227 |
| 2007/0061986 A1 * | 3/2007 | Huntington | A47L 13/18 | 15/227 |
| 2008/0229534 A1 * | 9/2008 | Vossoughi | A47L 13/18 | 15/227 |
| 2008/0271224 A1 * | 11/2008 | Wilbert | A41D 19/01523 | 2/161.1 |
| 2009/0247378 A1 * | 10/2009 | Carlesimo | A63B 21/00047 | 482/141 |
| 2010/0031411 A1 * | 2/2010 | Andrews | A41D 19/0017 | 2/20 |
| 2010/0287720 A1 * | 11/2010 | Kayata, Sr. | A47K 7/03 | 15/227 |
| 2011/0005017 A1 * | 1/2011 | Merriweather | A47L 13/19 | 15/227 |
| 2011/0167581 A1 * | 7/2011 | Arzarzar | A47L 13/18 | 15/227 |
| 2012/0023632 A1 * | 2/2012 | Provenzano | A41D 13/082 | 2/16 |
| 2012/0090073 A1 * | 4/2012 | Chen | A63B 71/14 | 2/161.1 |
| 2012/0324645 A1 * | 12/2012 | Lehr | A63B 21/4037 | 5/420 |
| 2013/0057006 A1 * | 3/2013 | Vinciguerra | A47G 23/0625 | 294/172 |
| 2013/0319625 A1 * | 12/2013 | Mohammadi | D21H 27/02 | 162/111 |
| 2014/0000052 A1 * | 1/2014 | Filho | A47L 13/18 | 15/227 |
| 2014/0135189 A1 * | 5/2014 | Thomason | A63B 23/1236 | 482/141 |
| 2014/0259502 A1 * | 9/2014 | Vitucci-Schneider | A47L 13/16 | 15/244.4 |
| 2014/0289987 A1 * | 10/2014 | Filho | A47L 13/18 | 15/227 |

* cited by examiner

RESILIENT HAND PAD AND BLOCK SYSTEM FOR RELIEVING HAND AND WRIST STRESS, AND RELATED PAIN, DURING YOGA AND RELATED FLOOR-BASED POSES AND EXERCISES

CROSS-REFERENCE TO RELATED APPLICATIONS

This U.S. non-provisional patent application is a Continued Prosecution Application (CPA) of, and claims priority to, U.S. non-provisional patent application Ser. No. 14/685,305 (issuing as U.S. Pat. No. 9,555,275 on Jan. 31, 2017), which was filed on Apr. 13, 2015 by the same inventor and which is incorporated-by-reference herein in its entirety.

FIELD OF THE INVENTION

The present disclosure relates generally to products for supporting a user's hands during floor-based exercising. More particularly, the present disclosure relates to a resilient hand form pad and optional block accessory constructed for supporting one or both hands of a user during the practice of yoga or any other floor-based static exercise, such as during a yoga pose or during a dynamic stretching exercise, in a manner that prevents user hand slipping during the exercise, while significantly reducing stress typically felt on the hands and wrists of a user particularly, a user having a preexisting condition or injury—during particular exercises, dynamic and static yoga practice, and the like.

BACKGROUND OF THE INVENTION

In recent years, the practice of yoga (and many other floor-based stretching and exercise practice) have proliferated at an incredible pace, particularly as individuals, both young and old, realize the profound health benefits. In general, yoga is a combined and integrated physical, mental, and spiritual practice or discipline. The origins of yoga speculatively date back many centuries to areas of Asia. The practice of yoga was brought to the attention of an educated Western public in the mid-19$^{th}$ century, along with related topics of Indian philosophy. Arguably, the current explosion in the popularity of yoga began in the 1980's, and is often practiced as a purely physical system of health exercises outside of and unconnected to any religious denomination.

There is also a significant physical exercise aspect to the practice of yoga. These physical exercises, which are beneficial for expanding the balance, flexibility and range of motion of a practitioner's body, are typically practiced upon a relatively thin resilient mat supported upon a hard ground or floor surface, such as a wood floor. Many of the dynamic movements and static poses necessarily require utilization of one or both hands to support at least a portion of the practitioner's body, during body movements (i.e., dynamic exercises and stretches) and during stationary poses. Unfortunately, for individuals having preexisting medical conditions and ailments, such as carpal tunnel syndrome, arthritis and physical injuries, for example, many floor-based exercises, yoga movements and poses, and the like, although performed on a mat can cause significant pain. As a result, many individuals, for whom yoga would be an incredibly useful tool for reducing, if not completely eliminating, the corresponding debilitating effects relating to various preexisting ailments, conditions, and injuries of the hands and wrists, are unable to practice yoga and other related floor-based exercises.

Another issue that is commonly encountered during yoga and other floor-based exercise practices is inadvertent slipping of the hands. In addition to placing a practitioner's palms on the surface of the floor or, more typically, a floor-covering mat, to support a portion of the body, combinations of lateral and longitudinal movement of the practitioner's body often place directional stresses on the hands, fingers and wrists, of the users that are typically only counteracted by the forces of friction between the mat surface and the portion of the user's hands in direct contact with the mat. However, this frictional contact and resistance for supporting the user's body during yoga exercise, or non-yoga specific related stretching and exercise movement, is often inadequate. The potential for hands slipping is further exacerbated by perspiration formed on the palms and sweat dripping off of the body and onto the underlying mat surface. This can cause undesirable hand slipping, which can result in the potential for serious hand, wrist, arm and other bodily injuries. Accordingly, there has been an ongoing effort, often by practitioner's themselves, to devise products to minimize; and preferably avoid, hand slipping, as well as devices aimed at reducing stress on the hands and wrists. Still, there is a need for a single system that could effectively address both of these commonly encountered issues. It would be highly desirable to provide such a system that is lightweight, portable, easy to use, and lends itself to easy and efficient manufacture to enable the production of an affordable, cost-effective system. With regard to yoga, many individuals use so-called "yoga blocks," which function as props to comfortably support individuals whom are not able to complete a full stretch or pose while attempting to maintain a desired bodily alignment. For example, blocks are great for standing poses in which one hand is on the floor, such as Ardha Chandrasana. The blocks provide a raised surface for the user to help get into postures safely and with proper alignment, allowing the user to experience the pose and its benefits even if, for example, the user's hamstrings or shoulders are tight. They help to make yoga accessible to beginners and those experiencing injury or other physical limitations. They can also help bring awareness to the body to feel how to properly engage and support muscles in a specific pose. Therefore, it would be highly desirable and incredibly beneficial to provide a system that not only includes a component that addresses hand slipping and painful pressure upon the hand and wrist, but also is adapted to be quickly and efficiently engaged with a resilient block component to provide the aforementioned added benefits of a yoga block.

In other instances where individuals are able to achieve a desired dynamic or static movement without the need for a block, it is still common for one or both of an individual's hands to slip against an underlying exercise mat or other surface. Or, even where hand slipping is not an issue, it is still a common occurrence for individuals to deal with the aforementioned hand and wrist pain. In such instances, it would be desirable to utilize a resilient hand pad component without the use of a complementary block or similar structure. Preferably, the resilient hand pad provides the dual functions of preventing hand slippage and providing some give to alleviate hand- and wrist-related injuries.

SUMMARY OF THE INVENTION

The present disclosure provides a novel resilient hand pad (and optional block) system that addresses limitations, drawbacks and disadvantages, of existing devices by providing a portable, affordable, effective system that very effectively prevents hand slipping, significantly reduces hand and wrist stress, and can be optionally selectively engaged with a system component for quick and easy conversion into a yoga block form.

The system is generally directed to a resilient hand pad body for stabilizing and supporting on a floor or other surface the hand of a user during both stationary/static and dynamic exercises and movements, in a manner substantially relieving stress that would otherwise normally be felt at various points and areas of the hand and wrist. The hand pad preferably includes a body having a top surface incorporating a cavity having the profile of a human hand for receiving therein the hand of a user.

In an aspect, a bottom surface of the hand pad may be provided having a slip-resistant surface texture, for example, taking the form of at least one of a plurality of corrugations and a slip-resistant surface coating material disposed upon the bottom surface, in the latter case the slip-resistant surface coating material having a higher coefficient of friction than a corresponding uncoated bottom surface.

In another aspect, slip-resistant hand pad bottom surface corrugations may be provided running transverse to a longitudinal orientation of the human hand profile cavity.

In another aspect, the debossed human hand profile, or cavity, is preferably defined by a continuous deboss, or cavity, sidewall.

In another aspect, the cavity sidewall may have a concave exterior surface.

In another aspect, various implementations of the hand pad body may incorporate either a unitary construction or a multi-layered construction.

In another aspect, the hand pad body preferably incorporates a resilient construction to provide some give, which reduces or eliminates undesirable stress on the hands, fingers, wrists and other parts of the human body.

In another aspect, a loop or similar lanyard-type structure may be provided extending outward from a periphery of the hand pad body.

In another aspect, a block that is independent of the hand pad body may be provided, wherein the hand pad body and the block are configured for releasable engagement with each other, such that the hand pad body engages a top side of the block in such a manner that, during use, the block functions to maintain the hand pad body position a desired distance above the exercise support surface.

In another aspect, the block may be provided having a non-horizontal tapered surface, which enables the resilient hand pad to be optionally maintained at a desired horizontal offset angle.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF EXEMPLARY IMPLEMENTATIONS

Figure 1:
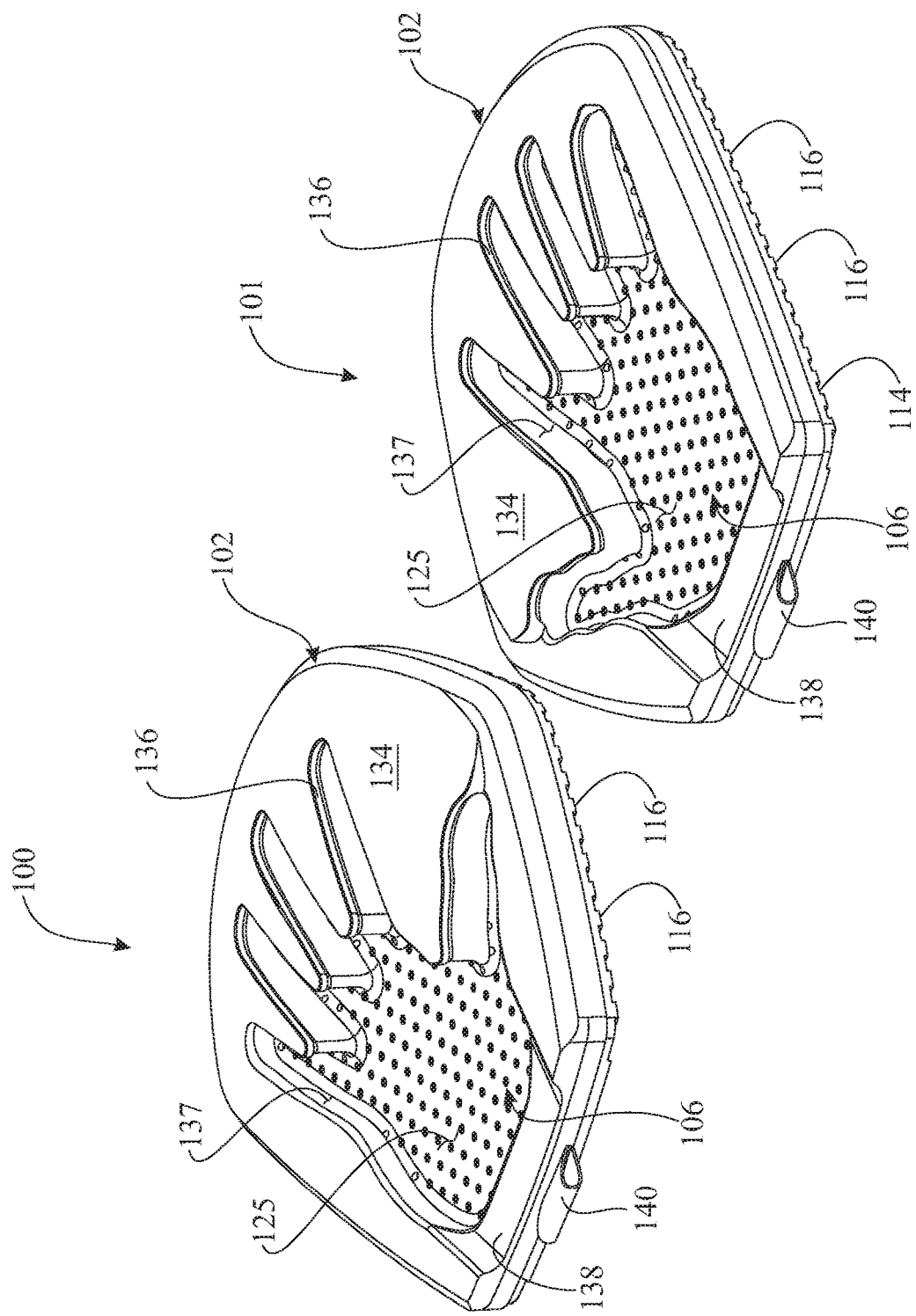
FIG. 1 presents an isometric view of a pair of resilient hand pads for use during yoga or any other floor-based exercise embodying the present invention.
Figure 2:
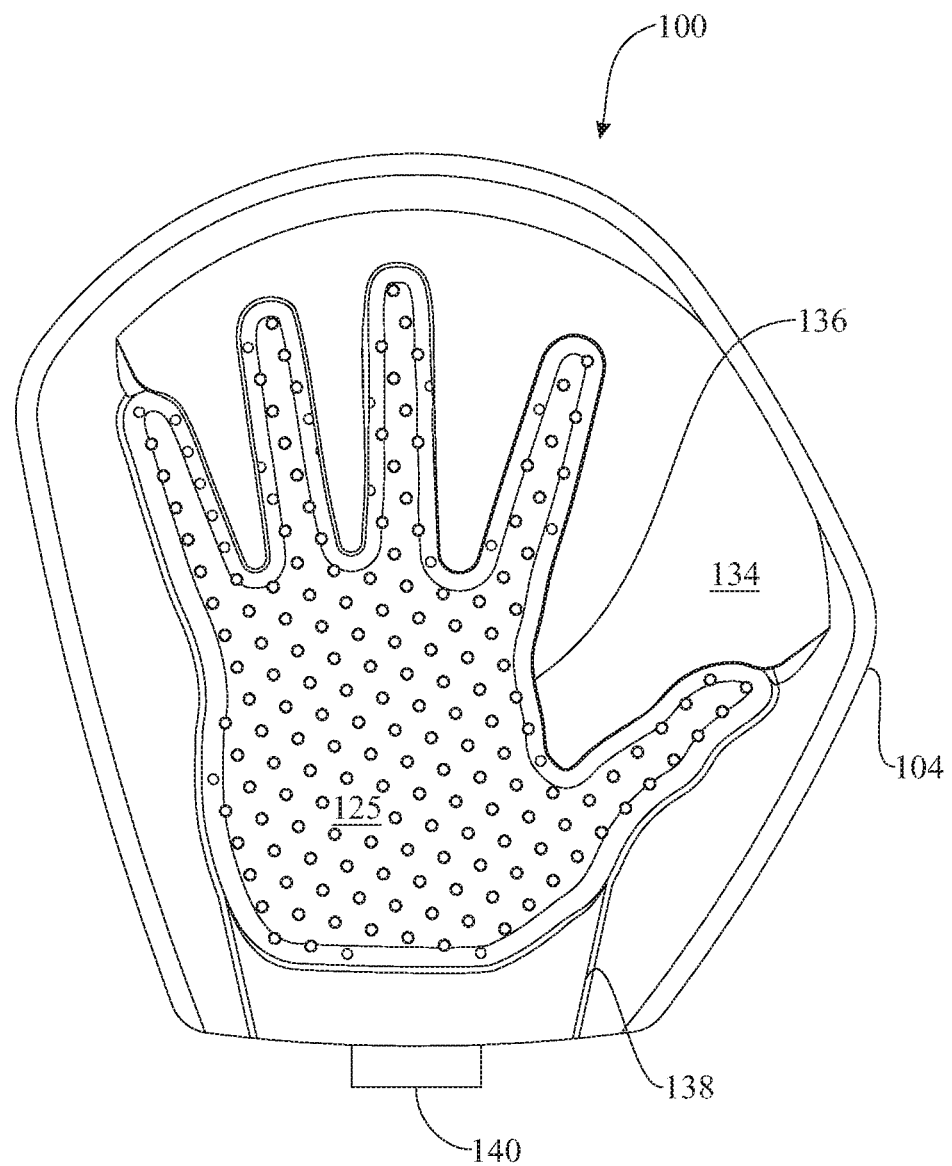
FIG. 2 presents a top plan view of the left hand pad according to the invention as embodied in FIG. 1.
Figure 3:
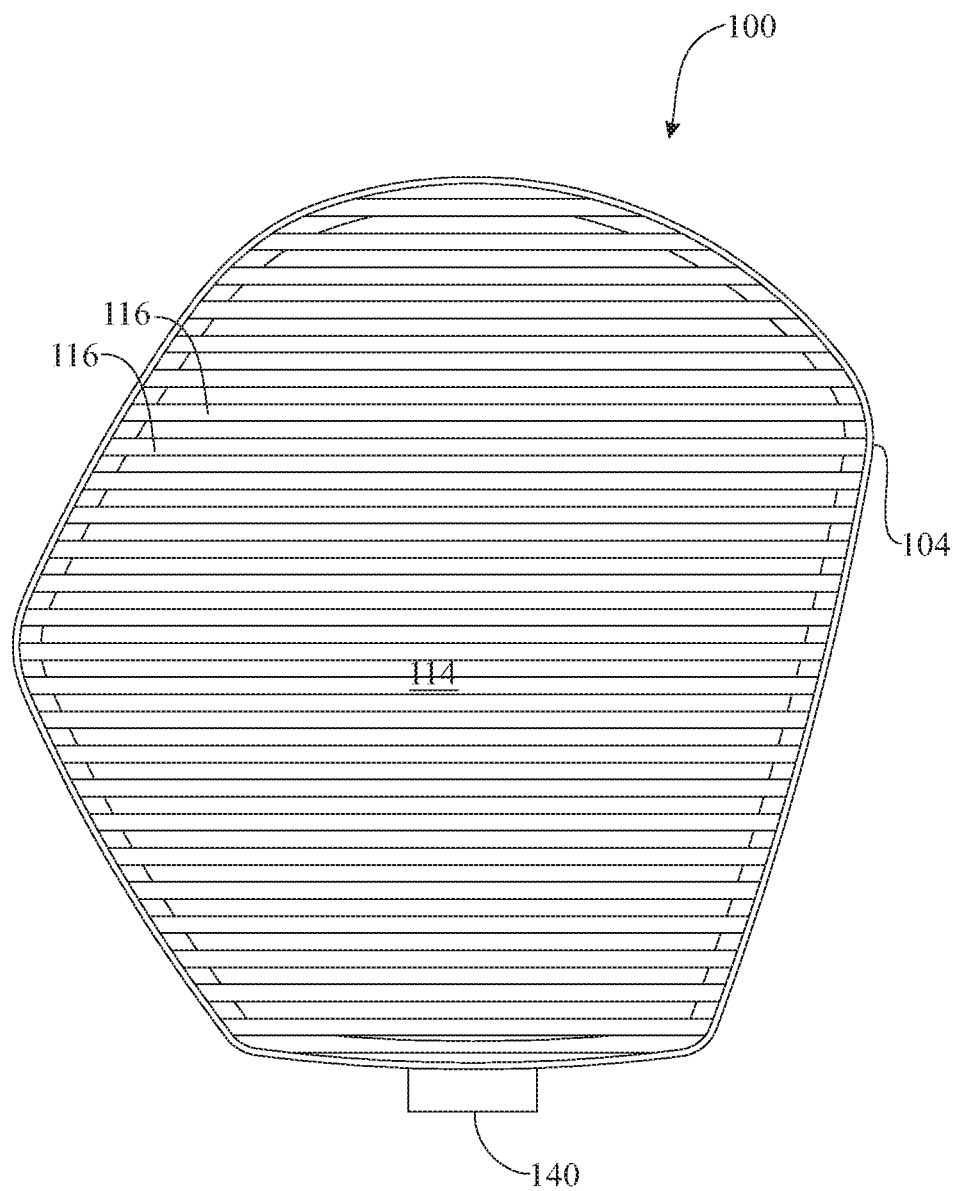
FIG. 3 presents a bottom plan view of the left and pad of FIG. 2.
Figure 4:
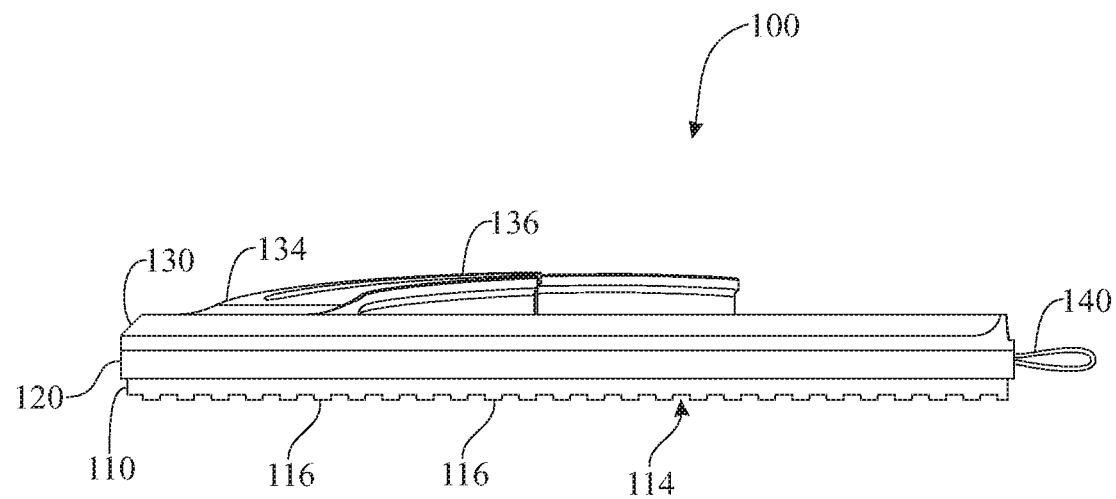
FIG. 4 presents a side elevation view of the left hand pad of FIG. 2.
Figure 5:
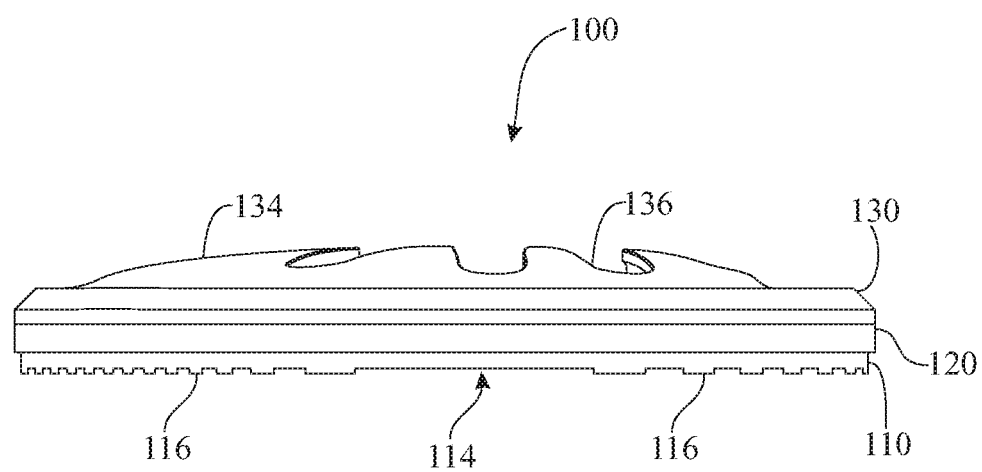
FIG. 5 presents an end elevation view of the left hand pad of FIG. 2.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, there is illustrated, in one exemplary implementation of the invention, a pair of left and right resilient hand pads, generally designated 100 and 101, respectively, are provided for stabilizing and supporting, on a floor or other surface, one or both hands of a user during static and/or dynamic exercises, both of which are common, for example, during the practice of yoga. Since the one (right) hand pad 101 is a mirror image of the other (left) hand pad 100, with their respective components being the same, only the components of the left hand pad 100 will now be described while the reference numerals used to identify its components are applied to both hand pads. The hand pad 100, in one optional exemplary implementation, may include a multilayer resilient body 102 having a top surface 134, a bottom surface 114 being spaced from the top surface 134 and an exterior periphery 104 (FIGS. 2 and 3), which can be of a regular or an irregular shape, extending between and interconnecting the top and bottom surfaces. The hand pad 100 also includes a cavity 106 debossed, or otherwise formed or created, in its body 102 in the profile of a palm and fingers of a human hand that enables the cavity 106 to receive the palm and fingers of a hand of a user therein. More particularly, the cavity is formed by a bottom wall 125 provided in the body 102 in the profile of the palm and fingers of a human hand, the bottom wall being disposed below and spaced from the top surface 134 of the body 102 and disposed above and spaced from the bottom surface 114 of the body. The cavity 106 is further defined by a continuous sidewall 137 surrounding the bottom wall 125 and extending upwardly therefrom to the top surface 134 of the body 102. The continuous sidewall 137 defines an aperture 136 in the body 102. The continuous sidewall 137 defines and aperture in the body 102 in the profile of the palm and fingers of the human hand in vertical registration with that of the bottom wall 125 so as to enable the palm and fingers of the hand of the user to be received through the hand profile aperture 136 and into a position in the cavity 106 on the bottom wall 125 thereof, as seen in FIG. 7, such that the continuous sidewall 137 aids in retention of the palm and fingers of the user's hand in the hand profile aperture/cavity 136 while the user is using the hand pad 100 during a stationary exercise and/or during a dynamic exercise. The body 102 of the hand pad 100 can further include a wrist depression portion 138 adjacent to a base of the cavity 106 for accommodating the wrist of the user. Also, a lanyard 140 may be affixed to the outer periphery 104 of the body 102 of the hand pad 100. The lanyard 140, which is preferably constructed from polyester, cart be utilized to assist in hanging the hand pad 100 in a convenient storage location. The bottom surface 114 of the body 102 of the hand pad 100 preferably incorporates a slip-resistant texture which, in one exemplary implementation, comprises a plurality of parallel spaced-apart corrugations 116 that are transverse to a longitudinal orientation of the cavity 106 in the hand pad body 102. Alternatively, or in combination with a friction-enhancing bottom surface contour, such as the aforementioned corrugations 116, a friction-enhancing coating of a material having a higher coefficient of friction vis-à-vis an uncoated bottom surface 114 may be disposed upon the bottom surface 114.

Figure 6:
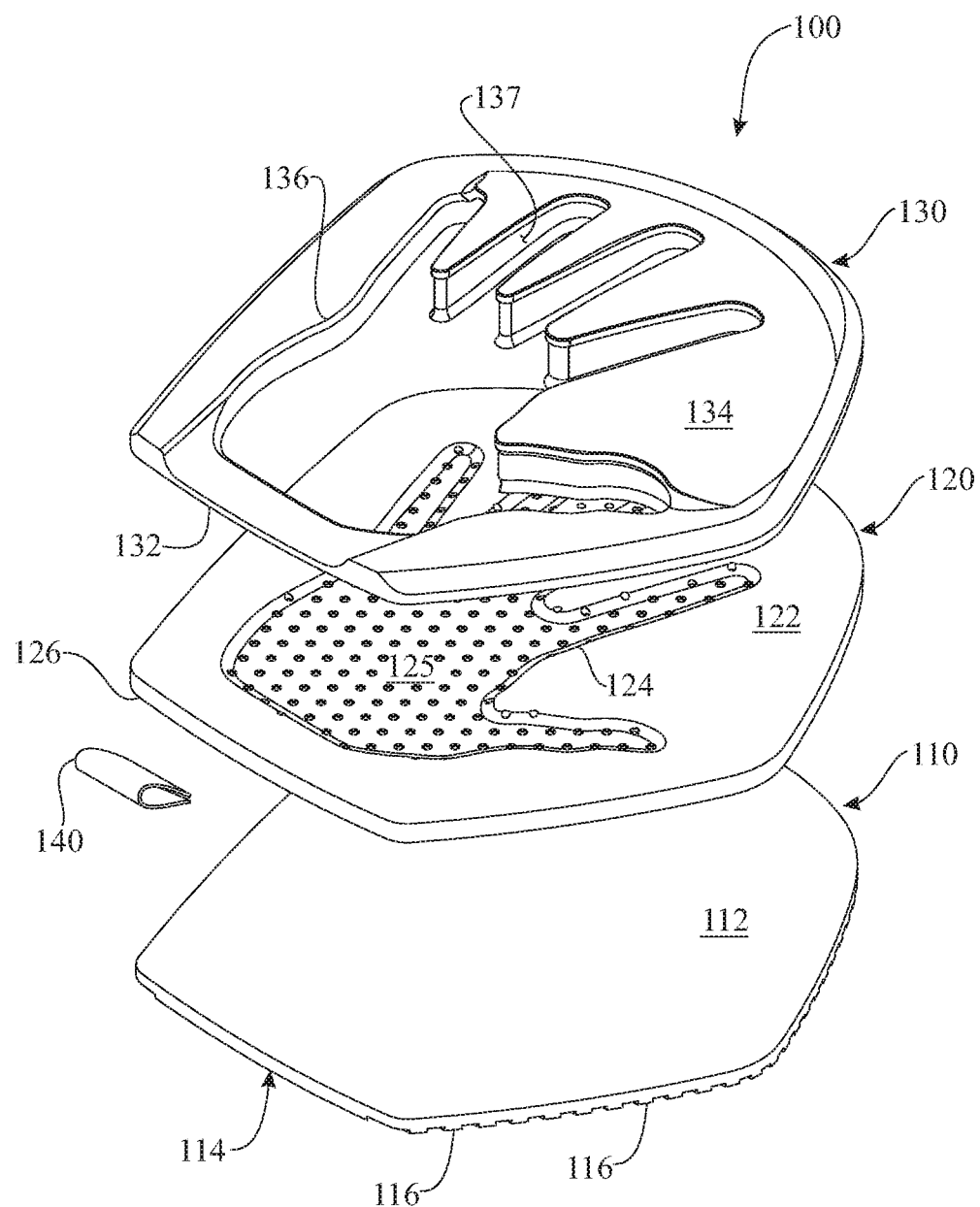
FIG. 6 presents an exploded isometric view of the left hand pad of FIG. 2 illustrating the various construction layers in accordance with a non-unitary hand pad body implementation of the invention.
Figure 7:
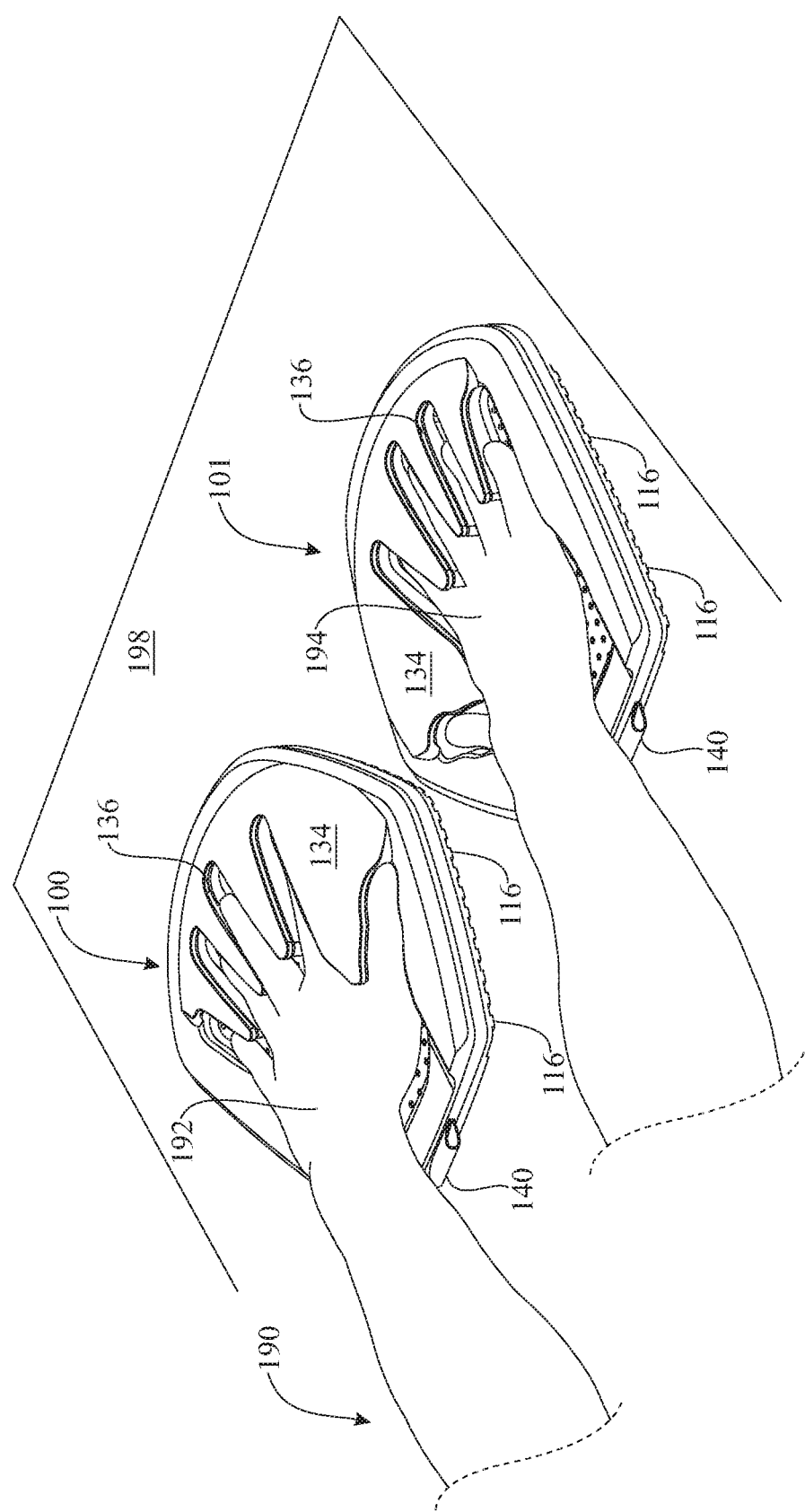
FIG. 7 presents a top isometric view of a user's hands engaging the pair of hand pads according to FIG. 1, for example, while conducting either a static yoga pose or a dynamic yoga (or other exercise) movement.

As best illustrated in FIG. 6, although the preferred construction incorporates a unitary, or one-piece, body 102 of the hand pad 100, it can also be comprised of a plurality of stacked layers. In that case, a top layer 130 of the hand pad body 102 has the top surface 134 and the hand profile aperture 136 formed therethrough, by the substantially continuous sidewall 137. The sidewall 137 can be vertically planar as illustrated, or can be concave (not shown) for receiving in the concavity a side portion of a user's fingers to aid in retention of a user's hand within the hand profile aperture 136. By way of example, the upper layer can be constructed from an expanded rubber, also referred to as a foam rubber (e.g., Ethylene-Vinyl Acetate (EVA) Thermo-Plastic Elastomer (TPE) foam), having a smooth outer surface, which is commonly used in the manufacture of yoga mats. EVA is preferably due to its light weight.

An intermediate layer 120 of the hand pad body 102 may be formed of a resilient material, providing some give to effectively relieve stress against the hand and wrist, and may include a debossment 124 defined in a top surface 122 of the intermediate layer 124 in the profile of the palm and fingers of a human hand. The debossment 124 forms the bottom wall 125 of the cavity 106 and accommodates supporting the palm and fingers of the user's human once received through the hand profile aperture 136, upon the bottom wall 125. The resilient nature of the intermediate layer 120 functions to cushion the user's hand during the performance of the stationary and dynamic movements, thereby relieving pressure against the user's hand and wrist. The top surface 122 of the intermediate layer 120 is preferably bonded to the bottom surface 132 of the top layer 130 in a manner such that the cavity sidewall 137 of the human hand profile aperture 136 is in vertical registration with the cavity bottom wall 125. Preferably, the cavity bottom wall 125 has a dimpled, or golf ball like, surface, which may be constructed from neoprene, EVA foams with varying densities, etc., which has anti-sweat, water resistant and antimicrobial characteristics.

A bottom layer 110 of the hand pad body 102 is formed, or otherwise created, from a durable material for contacting a floor or other supporting ground surface (not shown in FIGS. 1-7) and has an upper surface 112 bonded to a bottom surface 126 of the intermediate layer 120. The bottom layer 110 can be constructed from a slip-resistant material or, alternatively, have a slip-resistant coating layer (not shown) applied to a bottom surface 114 thereof. Optionally, the bottom surface 114 maybe provided having a plurality of corrugations 116 oriented transversely to the orientation of the cavity 106 or the human hand profile aperture 136 thereof. A lanyard 140, such as a fabric loop, is preferably affixed to a side edge of the body 102 of the hand pad 100 to aid in positioning the hand and wrist supporting pad 100, hanging the hand pad during storage of the hand pad when not in use, of the when not in use (e.g., to allow it to dry), or any other lanyard use. In this multi-layer implementation, it is preferable that the three EVA foam layers 110, 120 and 130, are permanently attached, forming a laminate-like construction, using either a chemical adhesive or heat bonding the layers to one another.

Referring now particularly to FIG. 7, during use, the pair of hand pads 100, 101, being a left hand-and-wrist supporting pad and a mirror-image right hand-and-wrist supporting pad, are initially placed upon a support surface 198, which may, for example, be a ground, a floor or a mat supported upon a floor, by way of example. A user 190 then places the user's left hand 192 in the human hand form cavity 106 in the body 102 of the left hand pad 100, and in like manner places the user's right hand 194 in the human hand form cavity 106 in the body 102 of the right-hand pad 101. The user can then perform the desired stationary and/or dynamic exercises while having her hands 192, 194 (and wrists) cushioned and supported by the body cavity bottom walls 125 of the hand and wrist stress-alleviating resilient intermediate layers 120, and securely limited against undesirable slipping along the bottom walls 125 not only by their slip-resistant dimpled anti-sweat, water resistant, antimicrobial surface construction, but by the continuous/contiguous interior sidewalls 137 of the human hand form cavities 106. Furthermore, the human hand profile apertures 136 help improve hand posture by spreading out the fingers of a user's hand when performing an exercise. This helps minimize injury by spreading the user's weight evenly throughout the wrists, arms, and shoulders. The slip-resistant nature of the bottom surface 114, such as corrugations 116 and/or a layer of slip-resistant material disposed upon the bottom surface, function to retain the hand pads 100, 101 in a stationary position, by frictional-engagement with the particular resilient pad support surface during the act of exercising.

Figure 8:
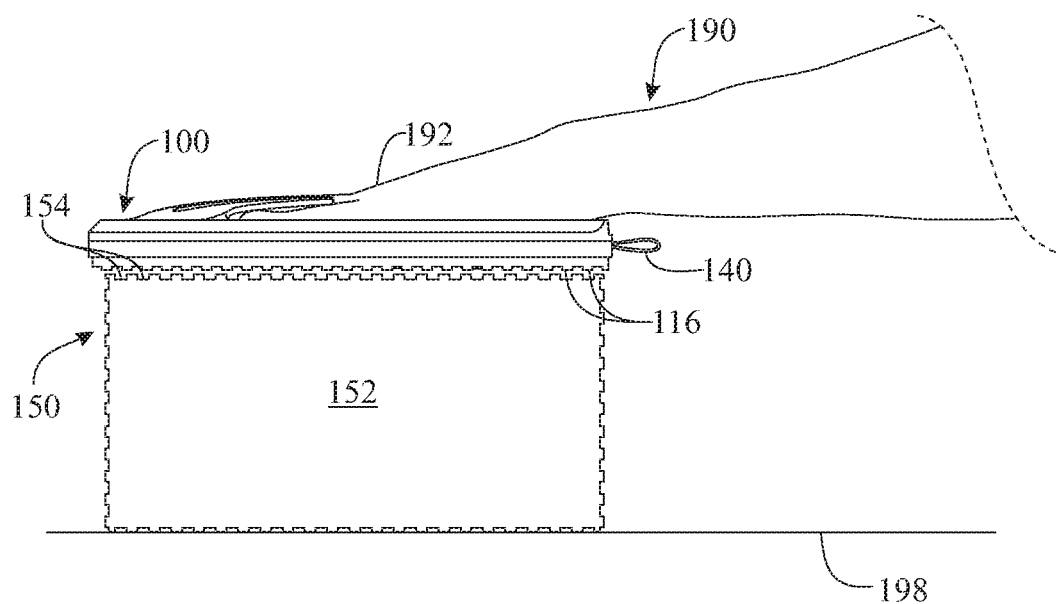
FIG. 8 presents a side elevation view of a further implementation of the system of the present invention, wherein a user's left hand is shown engaged in a left hand pad according to FIG. 2, and further utilizing a companion block, or brick, capable of being selectively engaged with the hand pad, for elevating the user's hand a distance above the floor surface, or floor mat surface where a mat is used, while also providing the benefits of maintaining minimal slippage with respect to the floor and reducing stress to the hand and wrist of the user.

Referring now particularly to FIG. 8, in a further implementation, the system 100 may incorporate a yoga block type component, shown generally as reference numeral 150, specifically constructed and configured for selective releasable locking engagement with a respective one of the resilient hand pads 100, 101. As previously described hereinabove, yoga blocks provide myriad benefits and are very commonly used particularly by students having stretching or other body movement limitations. The block 150 is comprise of a unitary main body 152 having generally planar sides, wherein the top side, and preferably all of the sides, have a plurality of uniformly-spaced corrugations, including female corrugation portions, or channels 154, sized, positioned and shaped for selective locking engagement with a corresponding plurality of uniformly-spaced corrugations, including male corrugations portions 116, sized and shaped for being snugly received within block channels 154 on the bottom surface of the hand pads 100, 101. Preferably, a slip resistant coating layer is provided disposed upon a bottom surface of the block, providing the same function as the slip resistant coating layer application to the bottom surface of the resilient hand and wrist pads 100, 101. The block 150 is preferably substantially rigid to elevate the hand pads 100, 101 above the floor or ground surface 198, thereby effectively creating an assembly combining the previously described benefits, well known to those skilled in the yoga arts, of a conventional yoga block with the benefits of the features of the unique resilient hand support pad components of the present system.

Figure 9:
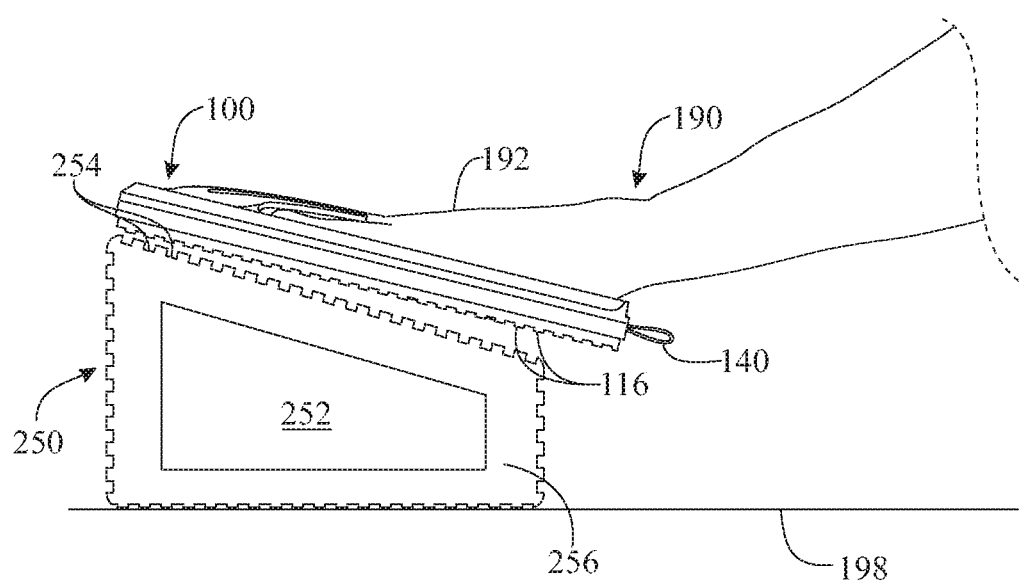
FIG. 9 presents a side elevation view of a further implementation of the system of the present invention, wherein a user's left hand is shown engaged in a left hand pad according to FIG. 2, and further utilizing a companion block having a non-horizontally oriented tapered top side, wherein the tapered top side of the block is capable of being selectively releasably engaged with the resilient hand pad, for elevating the user's hand a distance above the floor surface, or floor mat surface where a mat is used, while also providing the benefits of maintaining minimal slippage with respect to the floor and reducing stress to the hand and wrist of the user.

Although the block body 152 is shown in FIG. 8 having a rectilinear geometry, it will be apparent to those skilled in the art that other geometries are contemplated. For example, as best illustrated in FIG. 9, it may be desirable to provide a block 250, with a smooth EVA TPE foam core 252, surrounded by a corrugated EVA TPE foam layer 256, having a tapered, or inclined, upper surface, incorporating a corrugated surface, or channels 254, similar to those provided in the upper surface of block 152 in FIG. 8. In this manner, the resilient hand and wrist support pads 100, 101 could be configured for selective locking engagement with the inclined block upper surface to impart an incline in the resilient pad vis-à-vis a pad support surface.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A hand pad for stabilizing and supporting, on a ground or other lower support surface, the hand of a user of the hand pad during both stationary-type and dynamic-type exercises, said hand pad comprising:

a unitary hand pad body having a top surface, a bottom surface having a slip-resistant texture to prevent sliding of said hand pad against said lower support surface during use and a continuous peripheral exterior sidewall surface extending between and adjoining said top and bottom surfaces;

a cavity provided in said unitary hand pad body top surface, the cavity in the profile of a palm and fingers of a human hand, said cavity extending into said body from said top surface of said body toward and short of said bottom surface of said body, said cavity being defined by a cavity bottom wall in the form of the palm and fingers of the human hand, said bottom wall being disposed a distance below and spaced from said top surface of said body, and disposed a distance above and spaced from said bottom surface of said body, said cavity further defined by a cavity sidewall being continuous so as to peripherally surround said bottom wall without interruption and being contiguous with said bottom wall of said cavity and said top surface of said body so as to extend between and interconnect said bottom wall of said cavity and said top surface of said body, said continuous and contiguous cavity sidewall defining a human hand-shaped depression in said body being of a peripherally-enclosed configuration in the profile of the palm and fingers of the human hand and in generally vertical registration with said bottom wall so as to enable the palm and fingers of a hand of a user to be received into said hand-shaped depression and against said bottom wall in said cavity such that said continuous and contiguous cavity sidewall aids in retention of the palm and fingers of the hand of the user in said hand-shaped depression while the user is using said hand pad during a stationary exercise and during a dynamic exercise.

2. The hand pad as recited in claim 1, wherein said slip resistant texture for preventing sliding of said hand pad against said lower support surface further comprises a friction-enhancing hand pad bottom surface contour.

3. The hand pad as recited in claim 2, wherein said friction-enhancing hand pad bottom surface contour further comprises a plurality of parallel corrugations.

4. The hand pad as recited in claim 3, wherein said parallel corrugations are oriented transverse to a longitudinal orientation of said cavity in said body.

5. The hand pad as recited in claim 1, wherein said slip-resistant texture further comprises a friction-enhancing layer of material disposed over at least an area of the bottom surface of said hand pad, said friction-enhancing layer of material having a greater coefficient of friction against the hand pad supporting surface than the bottom surface of said hand pad.

6. The hand pad as recited in claim 1, wherein said cavity bottom wall is provided having a friction-enhancing cavity bottom wall exterior surface for increasing friction between the palm and fingers of said user and said cavity bottom wall exterior surface, wherein said friction enhancing cavity bottom wall exterior surface aids in reducing the occurrence of sliding of at least one of the user's palm and fingers against said cavity bottom wall.

7. The hand pad as recited in claim 6, wherein said friction-enhancing cavity bottom wall exterior surface further comprises a friction-enhancing cavity bottom wall exterior surface.

8. The hand pad as recited in claim 7, wherein said friction-enhancing cavity bottom wall exterior surface further comprises at least one of a cavity bottom wall contoured exterior surface and a friction-enhancing layer of material disposed upon at least a partial area of said cavity bottom wall exterior surface.

9. The hand pad as recited in claim 1, wherein said unitary hand pad body further comprises a solid unitary hand pad body.

10. The hand pad as recited in claim 9, wherein said solid unitary hand pad body is further comprised of a resilient material.

11. The hand pad as recited in claim 1, wherein said cavity has a profile of a palm and fingers of a human hand that is sized slightly larger than the actual palm and fingers of an outstretched hand of said user.

12. The hand pad as recited in claim 1, further comprising a block independent of said unitary hand pad body, said unitary hand pad body and said block configured for releasable engagement with each other such that said unitary hand pad body engages a top side of said block, wherein during use said block functions to maintain said unitary hand pad body a desired distance above said lower support surface.

13. The hand pad as recited in claim 12, wherein the top side of said block has a taper, such that said hand pad is maintained in a desired non-horizontal orientation while engaged with the tapered top side of the block.

14. The hand pad as recited in claim 1, further comprising a loop affixed to a periphery of said hand pad body.

15. The hand pad as recited in claim 1, wherein said cavity sidewall has a concave exterior surface profile.

16. The hand pad as recited in claim 1, wherein said cavity bottom wall has a convex exterior surface profile.

17. A hand pad for stabilizing and supporting, on a ground or other lower support surface, the hand of a user of the hand pad during both stationary-type and dynamic-type exercises, said hand pad comprising:
   a unitary hand pad body having a top surface, a bottom surface and a continuous peripheral exterior sidewall surface extending between and adjoining said top and bottom surfaces;
   a cavity provided in said unitary hand pad body top surface, the cavity in the profile of a palm and fingers of a human hand, said cavity extending into said body from said top surface of said body toward and short of said bottom surface of said body, said cavity being defined by a cavity bottom wall in the form of the palm and fingers of the human hand, said bottom wall being disposed a distance below and spaced from said top surface of said body, and disposed a distance above and spaced from said bottom surface of said body, said cavity further defined by a cavity sidewall being continuous so as to peripherally surround said bottom wall without interruption and being contiguous with said bottom wall of said cavity and said top surface of said body so as to extend between and interconnect said bottom wall of said cavity and said top surface of said body, said continuous and contiguous cavity sidewall defining a human hand-shaped depression in said body being of a peripherally-enclosed configuration in the profile of the palm and fingers of the human hand and in generally vertical registration with said bottom wall so as to enable the palm and fingers of a hand of a user to be received into said hand-shaped depression and against said bottom wall in said cavity such that said continuous and contiguous cavity sidewall aids in retention of the palm and fingers of the hand of the user in said hand-shaped depression while the user is using said hand pad during a stationary exercise and during a dynamic exercise,
   a block independent of said unitary hand pad body, said unitary hand pad body and said block configured for releasable engagement with each other such that said unitary hand pad body engages a top side of said block, wherein during use said block functions to maintain said unitary hand pad body a desired distance above said lower support surface.

18. The hand pad as recited in claim 17, wherein the top side of said block has a taper, such that said hand pad is maintained in a desired non-horizontal orientation while engaged with the tapered top side of the block.

* * * * *